US012709381B2

(12) United States Patent
Timms et al.

(10) Patent No.: US 12,709,381 B2
(45) Date of Patent: Aug. 18, 2026

(54) ROTARY ACTUATOR ASSEMBLY

(71) Applicant: Goodrich Actuation Systems Limited, Wolverhampton (GB)

(72) Inventors: Jack William Timms, Coven (GB); James Lawrence Holding, Cannock (GB); Colin Roger Harrison, Wolverhampton (GB)

(73) Assignee: Goodrich Actuation Systems Limited, Wolverhampton (GB)

( * ) Notice: Subject to any disclaimer, the term of this patent is extended or adjusted under 35 U.S.C. 154(b) by 73 days.

(21) Appl. No.: 18/774,050

(22) Filed: Jul. 16, 2024

(65) Prior Publication Data

US 2025/0033764 A1 Jan. 30, 2025

(30) Foreign Application Priority Data

Jul. 26, 2023 (EP) .................................... 23275111

(51) Int. Cl.
*B64C 13/50* (2006.01)
*H02K 7/00* (2006.01)

(52) U.S. Cl.
CPC ............. *B64C 13/50* (2013.01); *H02K 7/003* (2013.01)

(58) Field of Classification Search
CPC ................................ B64C 13/50; H02K 7/003
See application file for complete search history.

(56) References Cited

U.S. PATENT DOCUMENTS 5,722,616 A * 3/1998 Durand .................. F15B 15/12 244/226
8,266,976 B2 9/2012 Waide
10,066,715 B2 9/2018 Larson et al.
10,220,937 B2 3/2019 Balsiger et al.
10,759,515 B2 9/2020 Van De Veire et al.
11,273,904 B2 3/2022 Dussart et al.
2003/0100398 A1 5/2003 McKay et al.
2023/0150652 A1* 5/2023 Harrison ................ B64C 13/34 244/99.2

FOREIGN PATENT DOCUMENTS

DE 69516987 T2 6/2000
EP 4180324 A1 5/2023

OTHER PUBLICATIONS

Abstract for DE69516987 (T2); Published: Nov. 30, 2000, 1 page.
European Search Report for Application No. 23275111.5, mailed Jan. 24, 2024, 8 pages.

* cited by examiner

*Primary Examiner* — Gregory Robert Weber
(74) *Attorney, Agent, or Firm* — Kilpatrick Townsend & Stockton LLP

(57) ABSTRACT

A rotary actuator assembly for moving a first relatively movable part relative to a second relatively movable part. The assembly includes: a rotary actuator having a plurality of annular earth members for attachment to one of the first and the second relatively movable parts and one or more annular output members for attachment to the other of the first and second relatively movable parts. The annulus of the earth members and the one or more output members are coaxial defining a lumen through the rotary actuator along an actuator axis A. The assembly also includes at least one rotary motor arranged to rotate the annular output member relative to the annular earth members, about the actuator axis A. The rotary actuator also includes a rod extending through the lumen and extending axially beyond the earth members.

12 Claims, 2 Drawing Sheets

ROTARY ACTUATOR ASSEMBLY

CROSS-REFERENCE TO RELATED APPLICATIONS

This application claims the benefit of European Patent Application No. 23275111.5 filed Jul. 26, 2023, the disclosure of which is incorporated herein by reference in its entirety.

TECHNICAL FIELD

The present disclosure is concerned with means for mounting a motor to a rotary actuator e.g. for driving movable parts of a wing assembly of an aircraft.

BACKGROUND

Modern aircraft include a number of movable surface or panels such as flight control surface of wing tips that are configured to be movable relative to another part of the aircraft e.g. to another, fixed or stationary part of a wing. The movable parts are typically moved relative to the stationary part by means of an actuator. In applications where it is important to minimise weight and size of parts on an aircraft, rotary actuators are used comprising a fixed stator part and a movable rotor part driven by one or more motors. Rotary geared actuators (RGAs) have been developed in which the input from the motor and the output of the RGA are linked by a series of gears to step down high speed, low torque rotation of the motor to provide slower speed, high torque positioning of a movable part. These actuators are typically positioned along the hinge line between a stationary part of the structure e.g. wing, and a relatively rotatable part. The RGA has so called earth members for fixing the actuator to one of the parts and output members for attachment to the other part. Typically, the earth members are attached to the stationary part of the structure and are mounted via flanges and bolts. The output members are then attached to the movable part also by known attachment means such as bolts or the like.

The attachment lugs and mounts required to attach the earth members to the wing structure and to attach the output members to the moveable part (or vice versa) add to the overall size and weight of the actuator assembly and the envelope required to accommodate the assembly. Where space and weight allowance is limited, such as in aircraft, there is a desire to reduce the size and weight of mounting/attachment components whilst maintaining the required secure attachment.

In addition, attaching an RGA to the structure is generally time and labour intensive and as each lug/fixing mechanism needs to be fastened securely by hand, there is a risk of human error each time. Furthermore, each attachment point where a lug or the like is fastened to the structure, is subject to loads that cause local stresses particularly during flight and during operation that can loosen or damage the fastening.

The motor or motors that drive (e.g. via gears) the output member(s) also typically need to be secured to a fixed structure and this is also typically done by lugs or flanges extending radially outwards from the outer dimension of the motor to attach the motor to e.g. fixed aircraft structure and/or earth members of the actuator.

One solution that has been proposed to avoid the need for attachment flanges or lugs between the earth members and the wing parts and between the output members and the other wing parts is to provide the engagement between the RGA members and the respective wing parts using splines. The earth members and the output member of the RGA are provided with radially outwardly formed splines around their circumference. The wing provides as hinged joint formed of a first part attached to a moveable part of the wing and a second part attached to a stationary part of the wing. The first part defines a passage therethrough to receive the RGA. The second part is comprised of a pair of arms that extend either side of the first part. The arms also define a passage therethrough and the arm passages align with the passage through the first part along the hinge line of the wing to define a passage through which the RGA is assembled. The first and second parts of the hinge joint have, in the passage, inwardly extending splines. When the RGA is assembled through the passage, the outer splines of the earth members engage with the splines extending inwardly from the arms of the second part and the outer splines of the output member engage with the inward splines of the first part of the hinge joint. The earth members are therefore fixed in relation to the stationary wings part and as the output member of the RGA is rotated (by the RGA motor) relative to the earth members, it causes corresponding rotational movement of the movable part of the wing.

Whilst such an arrangement is simpler and more compact that other designs using lugs/flanges for fastening the RGA relative to the wing parts, the motor of the actuator which drives rotation of the output member (e.g. via gears) is constrained as to its maximum outer dimension since the motor must be able to pass through the passage of the hinge joint for assembly. Because the motor also needs attachment points e.g. lugs or flanges that extend radially outwards, and these also need to be able to pass through the passage, the actual outer diameter of the motor component that contribute to the torque will necessarily need to be smaller than the inner diameter of the passage to enable the motor and attachments points to pass therethrough. A key parameter of an RGA motor for performance is its outer diameter as the larger the motor outer diameter, the greater the resulting torque. There is, therefore, a desire to maximise the outer diameter of the motor whilst still enabling a compact overall RGA assembly.

SUMMARY

According to the present disclosure, there is provided a rotary actuator assembly for moving a first relatively movable part relative to a second relatively movable part, the assembly comprising a rotary actuator having a plurality of annular earth members for attachment to one of the first and the second relatively movable parts and an annular output member for attachment to the other of the first and second relatively movable parts, the annulus of the earth members and the output member being coaxial defining a lumen through the rotary actuator along an actuator axis A, the assembly further comprising a rotary motor arranged to rotate the annular output member relative to the annular earth members, about the actuator axis A, the rotary actuator assembly further comprising a rod extending through the lumen and extending axially beyond the earth members, and wherein the motor is mounted around, and engages the rod such that rotation of the motor causes corresponding rotation of the rod, and wherein the rod is connected to the output member such that rotation of the rod causes rotation of the output member.

In another aspect, there is provided a mounting assembly comprising a rotary actuator assembly as described above and a mounting sleeve having a plurality of radially inwardly extending circumferential splines positioned along the length of the sleeve so as to engage with the radially outwardly extending splines of the rotary actuator assembly when inserted in the mounting sleeve.

BRIEF DESCRIPTION

Examples of an assembly according to the present disclosure will be described with reference to the drawings. It should be noted that other implementations are also possible within the scope of the claims.

DETAILED DESCRIPTION

Figure 1:
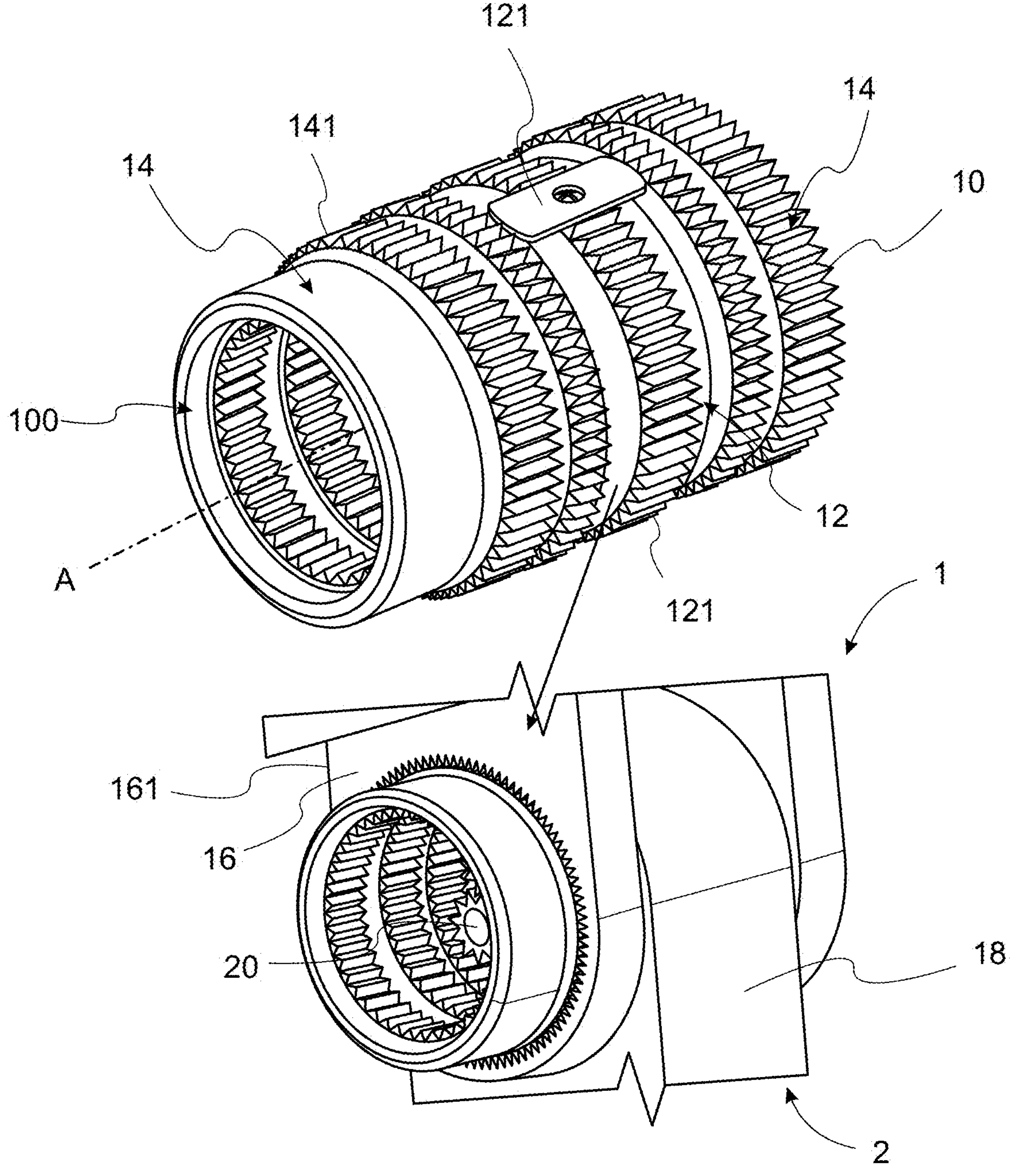
FIG. 1 shows a known rotary actuator with splines for attachment to a splined hinge joint.
Figure 2:
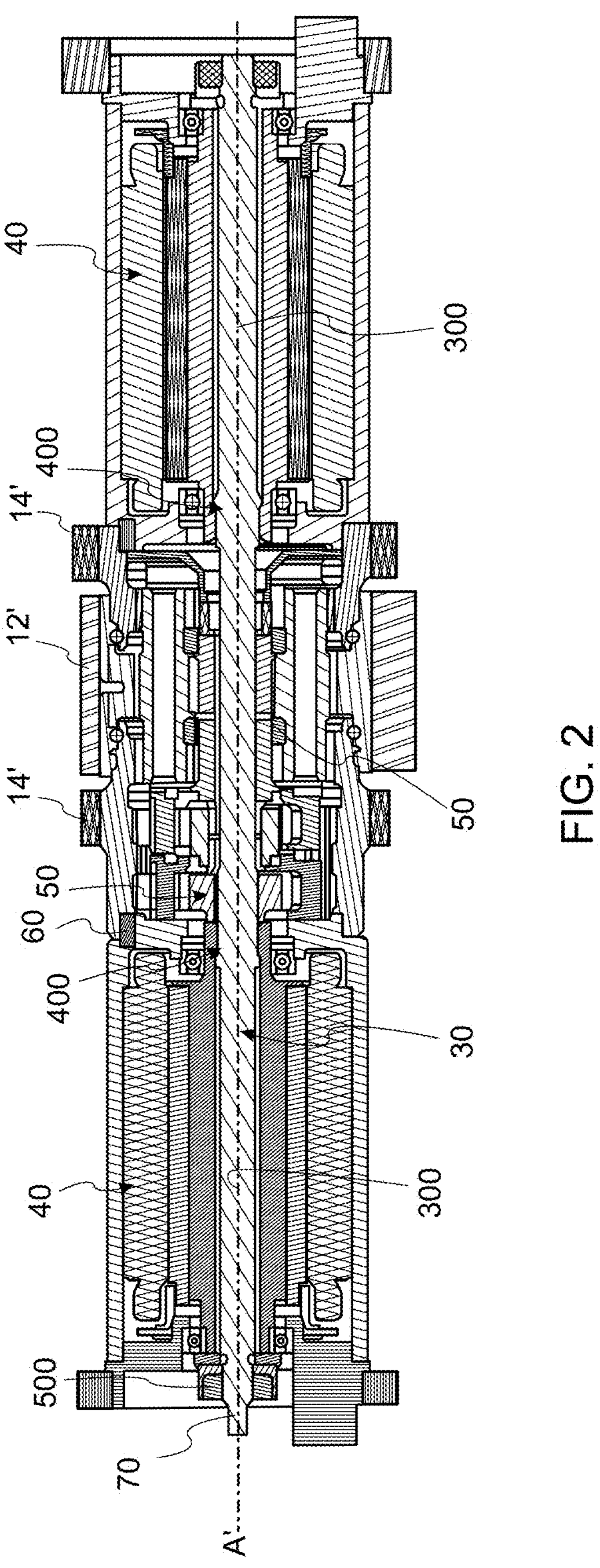
FIG. 2 shows an example of a rotary actuator assembly according to the present disclosure.

FIG. 1 shows a rotary actuator 10 designed to be positioned between and attached to two relatively moveable parts such as, but not limited to, a fixed wing structure and a relatively movable part e.g. a slat or flap or a foldable wing tip. Input rotation is provided to the actuator by a drive means such as a motor (not shown) that drives an input shaft. This causes rotation of the gears (20, not shown in detail) of the actuator which results in rotation of the outlet member 12 that is fixed to the second relatively movable part. The earth members 14 are fixed to the other relatively movable part (e.g. a stationary part). The actuator operation is known in the art and will not be described in any detail. The drawing is schematic only. Different types of rotary actuator are possible. With a geared actuator, as shown, the gears of the actuator operate such that the output member rotates in response to, but at a different speed to the input rotation to cause relative rotation of the movable part, to which the output member is attached.

The rotary actuator extends axially along an axis A and the gears (if present), earth members 14 and output member 12 are arranged around the axis such that the output member 12 rotates about the axis. The earth members 14 are annular or circumferential rings mounted around the shaft and several earth members 12 may be positioned around the actuator spaced apart in the axial direction. In the example shown, an outlet member is provided, with an earth member either side. The number of earth members and outlet members can, however, be selected according to the use and design requirements of the actuator.

In a conventional arrangement, the actuator is mounted to the first relatively moveable 1 part via earth members secured to the part in any known way by a fixed fastener such as a bolt attached to the earth member by an external housing or by means of radially extending lugs with a hole therethrough. The lugs fit into attachment mounts provided on the relatively movable part which also have holes therethrough. The earth members are secured in positioned by passing a bolt through the holes in the attachment mounts and the lugs. Each earth member may be provided with several lugs and bolts. A single bolt or rod can be passed through the whole row of earth members and secured by a fastener at each end. It is also feasible that each lug and attachment mount pair could be fastened with a separate fastener.

The outlet members are arranged to be attached to the other of the relatively movable parts 2. Again, typically, the outlet members are provided with lugs with holes therethrough which fit between mounting attachments affixed to the second relatively movable part and one or more bolts is passed through the matched-up holes to secure the outlet members to the relatively movable part. The bolts can be secured by fasteners either at each lug location or a single bolt passes through all lugs and is secured at its ends.

In this way, the earth members, which do not rotate with the actuator output member, are fixed to one part of, say, the wing, and the relatively rotatable output members, that rotate with the actuator output member, are attached to move the other part of the wing to rotate it relative to the first part.

As mentioned above, although the earth members, output members, lugs, attachment mounts and bolts in such conventional arrangements do not actually contribute to the actuator function, they add substantially to required space envelope and to the overall weight of the assembly.

In another known, improved, assembly as shown in FIG. 1, the mounting of the actuator with respect to the relatively movable parts, is by means of circumferential splines around the actuator instead of radially extending lugs and mounts and bolts therethrough. This greatly simplifies assembling the actuator and also takes up less space and has reduced weight.

Here, instead of the earth members having lugs, the earth members 14 are provided with radially extending locking features e.g. splines 141 around the circumference of the annular ring forming the earth member, the splines extending radially outwards. The splines 141 are configured to engage with complementary splines 161 extending inwardly from a socket or sleeve 16 formed on the first relatively movable part e.g. the fixed wing part. Instead of splines, the locking features may take other forms that engage to provide the desired locking between the earth members and the receiving sleeve.

Similarly, the output members 12 may be provided with similar splines 121 around their circumference with will engage with complementary splines formed in a sleeve part 18 provided on the other relatively movable part e.g. a movable wing panel.

In the example shown, all of the earth members 14 and the output members 12 are provided with splines. In other examples, though, it may be that only some of the earth members and/or output members are provided with splines. For example, only the earth members might have a spline fitting with one wing part, while the output members have a conventional lug/mount fitting, or vice versa.

A sleeve for receiving the actuator will be defined by sleeve parts 16, 18 formed on or attached to the adjacent edges of the relatively movable parts i.e. the resulting sleeve formed by the sleeve parts will define the hinge between the two parts and will have inwardly extending splines. The actuator can then be pushed into the sleeve, in the axial direction, for assembly such that the splines on the earth members 141 will engage with splines 161 of the sleeve part 16 attached to a fixed structure part and the splines 121 on the output members 12 will engage with splines on the other part 18 of the sleeve that is affixed to the other part.

Once inserted in the sleeve, the actuator can be locked axially in position by any suitable means e.g. bolts, locking rings, caps etc.

Attaching the actuator to the relatively movable parts in this way allows the actuator to be easily mounted but ensures a secure attachment and reliable rotation operation. The fastening components have reduced size and weight compared to known mounting assemblies and spread the stress locations around the rings rather than providing single stress points at the lugs.

As mentioned above, even with such a compact, spline-engaged assembly, the motor for driving rotation of the output member 12 needs to be sized such that it can pass axially through the sleeve of the hinge joint for assembly. Furthermore, the motor needs to be fixed against rotation or spinning. Typically, the motor is secured to a fixed structure and/or to the earth members by means of attachment points such as lugs or flanges on the outer surface of the motor, and the design of the overall motor including these attachment points needs to be sized so that it can pass through the sleeve passage for assembly. This means that the outer diameter of the actual motor components, not including the attachment points, has to be less that the inner diameter of the sleeve passage due to the additional radial envelope for the attachment points. The torque performance of the motor, for a given size of passage, is, therefore, not maximised. If the outer diameter of the motor parts could be essentially the same as the inner diameter of the sleeve passage through the hinge joint, increased motor torque would be possible for the same overall actuator envelope.

The assembly of this disclosure allows the size of the motor to be maximised by providing a rod 30 through the actuator assembly, along the axis A' through the annulus of each of the earth members 14' and the output member 12' onto which the motor 40 is mounted. In the example shown, the rod 30 extends axially out from both ends of the actuator assembly defined by the earth members 14' and the output member 12' providing a motor mounting portion 300 each side of the actuator assembly so that the assembly can be provided with two motors 40, one motor on each motor mounting portion 300. This is, however, just one example, and an arrangement is also feasible, using this concept, with only a single motor. In other implementations, several motors could be attached either side of the actuator, with the number of motors being determined by the application of the assembly.

The motor 40 is mounted around the rod 30 and is engaged with the rod for rotation of the rod with the motor e.g. via a mating spline arrangement 400 between the motor and the rod 30. An advantage of such a spline arrangement 400 is that the relative location of the splines 400 relative to the actuator components can be varied either side of the actuator to create a variable stiffness element. In other words, varying the relative axial location of the spline connection allows the effective stiffness of the motors to be tuned with respect to the actuator input—as the distance of the splines 400 from the motor increases, the stiffness decreases. In the example shown, the motor 40 (or, here, each motor) is held in tight engagement with the rod by means of fasteners at the axially outer ends of the motor that apply an axially inward tension on the motor to secure it to the rod. In this example, fasteners 500 are provided at each end of the rod, but it is also feasible to have fasteners at only one end. As the motor 40 rotates, therefore, it causes rotation of the rod 30.

The rod 30 is connected to rotatably drive the output member 12'. The rod may be directly connected to the output member 12' such that rotation of the rod causes a corresponding rotation of the output member. Alternately, the rod may be connected to the output member by means of a gear assembly 50 arranged coaxially around the rod, between the rod and the output member 12'. Thus, as the rod 30 is rotated, this causes rotation of the output member 12' according to the ratio of the gear assembly 50. As can be seen, because the motor is secured by the internal rod 30, no additional attachment points are required on the outer diameter of the motor and so the maximum outer diameter of the motor can be substantially the same as the inner diameter of the earth and output members.

In the example shown, in order to prevent spin of the motor 40 relative to the actuator assembly, a locking mechanism such as an anti-rotation pin 60 may be provided between the earth members and the motor.

Because the rod 30 can extend beyond the ends of the actuator assembly (see 70), it is also possible to rotate the rod manually to cause rotation of the output member.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

The invention claimed is:

1. A rotary actuator assembly for moving a first relatively movable part relative to a second relatively movable part, the assembly comprising:

a rotary actuator having a plurality of annular earth members for attachment to one of the first and the second relatively movable parts and one or more annular output members for attachment to the other of the first and second relatively movable parts, wherein the annulus of the earth members and the one or more output members are coaxial defining a lumen through the rotary actuator along an actuator axis A;

at least one rotary motor arranged to rotate the annular output member relative to the annular earth members, about the actuator axis A, the rotary actuator assembly further comprising:

a rod extending through the lumen and extending axially beyond the earth members;

wherein the at least one rotor motor is mounted around, and engages the rod such that rotation of the at least one rotor motor causes corresponding rotation of the rod, wherein the rod is connected to the one or more output members such that rotation of the rod causes rotation of the output member; and a joint connecting the rod to the at least one rotary motor, wherein the joint is in the form of mating splines on the rod and the at last one rotary motor.

2. The assembly of claim 1, wherein the rod is connected to the output member via a gear assembly.

3. The assembly of claim 1, comprising two or more rotary motors, at least one rotary motor provided either side of the rotary actuator.

4. The assembly of claim 1, wherein the one or more output members are positioned between one or more pairs of earth members.

5. The assembly of claim 1, further comprising:

an anti-rotation feature between one or more earth members and one or more of the at least one rotary motor to prevent rotation of the motor relative to the earth member.

6. The assembly of claim 5, wherein the anti-rotation feature is an anti-rotation pin.

7. The assembly of claim 1, wherein the rod extends from the assembly such that it can be manually rotated from one end.

8. The assembly of claim 1, wherein the location of the joint on the rod can be varied to vary the motor stiffness with respect to the actuator.

9. The assembly of claim 1, wherein the earth members and/or the one or more output members are provided with radially outwardly extending locking features around their circumference configured to be received in a mounting sleeve having complementary locking features to engage with the radially extending locking features.

10. The assembly of claim 9, wherein the radially extending locking features are splines.

11. The assembly of claim 10, wherein both the earth members and the one or more output members are provided with the radially extending locking features.

12. A mounting assembly comprising:

a rotary actuator assembly as claimed in claim 9; and a mounting sleeve having a plurality of radially inwardly extending circumferential locking features positioned along the length of the sleeve so as to engage with the radially outwardly extending locking features of the rotary actuator assembly when inserted in the mounting sleeve.

* * * * *